(12) United States Patent
Isaksen et al.

(10) Patent No.: US 7,835,259 B1
(45) Date of Patent: Nov. 16, 2010

(54) CONTROL ALGORITHM USING HYSTERESIS SUB-STATES IN QAM MODEMS

(75) Inventors: David Bruce Isaksen, Mountain View, CA (US); Mark Fong, San Jose, CA (US)

(73) Assignee: Wideband Semiconductors, Inc., Mountain View, CA (US)

( * ) Notice: Subject to any disclaimer, the term of this patent is extended or adjusted under 35 U.S.C. 154(b) by 716 days.

(21) Appl. No.: 11/805,903

(22) Filed: May 26, 2007

Related U.S. Application Data

(63) Continuation-in-part of application No. 10/734,415, filed on Dec. 11, 2003, now abandoned.

(51) Int. Cl.
    *H04J 11/00* (2006.01)
(52) U.S. Cl. .................. 370/203; 375/232; 375/348
(58) Field of Classification Search ............ 370/203; 375/232, 348
    See application file for complete search history.

(56) References Cited

U.S. PATENT DOCUMENTS

| 6,067,319 A * | 5/2000 | Copeland ............... 375/232 |
| 6,278,741 B1 | 8/2001 | Danzer et al. |
| 6,510,188 B1 | 1/2003 | Isaksen et al. |
| 6,904,098 B1 | 6/2005 | Isaksen et al. |
| 7,079,605 B1 | 7/2006 | Isaksen et al. |

* cited by examiner

*Primary Examiner*—Kevin C Harper
(74) *Attorney, Agent, or Firm*—Boris G. Tankhilevich

(57) ABSTRACT

An apparatus for automated acquisition of a QAM signal. The apparatus employs a State machine progressing from an initial State to a final State. The State Machine comprises: (A) an AGC State further comprising a Minimum Sub-State further comprising: Coarse Estimate Sub-State; and an AGC Lock Sub-State further comprising Maximum Sub-State; (B) a Clock 1 State further comprising a Minimum Sub-State, and a Maximum Sub-State; (C) a Clock 2 State further comprising: a Minimum Sub-State; and a Maximum Sub-State; and (D) a Blind State further comprising a Minimum Sub-State; a Threshold Sub-State further comprising a Maximum Sub-State; and a Hysteresis Sub-State.

24 Claims, 9 Drawing Sheets

Sub States for Clock 2 (State = 3)

Sub States for Clock 1 (State = 2)

Sub States for Clock 2 (State = 3)

CONTROL ALGORITHM USING HYSTERESIS SUB-STATES IN QAM MODEMS

This is a continuation-in-part of the U.S. patent application Ser. No. 10/734,415, "CONTROL ALGORITHM IN QAM MODEMS", filed on Dec. 11, 2003 now abandoned.

FIELD OF THE INVENTION

The present invention is in the field of QAM demodulators. More specifically, the present invention relates to the field of control algorithms for QAM modems.

DISCUSSION OF THE PRIOR ART

Typically, in the prior art, an external Digital Signal Processor (DSP) is used to perform a controlling function for a QAM modem.

However, in order to perform a controlling function for the QAM modem externally, the external DSP controller has to sequentially pull all relevant processing data associated with the QAM modem control function from the QAM modem itself. Thus, it is a Master-Slave model, in which the DSP external controller is a Master device, and the QAM modem is a Slave device. The drawback to this Master-Slave model to control the QAM modem is a high latency of such QAM modem control due to insufficiently efficient physical interface of the external DSP (the Master device) with the QAM modem (the Slave device).

In addition, the prior art external DSP controller of a QAM modem makes the determination of whether a symbol loop of the QAM modem (or a carrier loop of the QAM modem) is locked by looking at all symbol loop parameters (or all carrier loop parameters respectively). This approach has a relatively high probability of a false lock.

What is needed is to realize a QAM modem controlling function internally in order to eliminate the need for an external physical access to the QAM modem thus decreasing the overall QAM modem latency and decreasing the probability of a false symbol loop lock (or a false carrier loop lock).

SUMMARY OF THE INVENTION

To address the shortcomings of the available art, the present invention provides a method and apparatus configured to internally realize a control function for the QAM modem by using a control algorithm embedded in the QAM modem itself. This approach eliminates a need for the physical access to the QAM modem by a controlling device. This results in decreased latency of the QAM modem. In addition, the control algorithm embedded in the QAM modem looks at the ultimate parameters (like a symbol error rate or a constellation error) to determine whether the QAM modem symbol loop (or carrier loop) is locked. The symbol error rate is the best predictor of whether the QAM modem symbol loop (or the QAM modem carrier loop) is locked because it has the least probability of a false lock. To improve latency the control algorithm also utilizes the hysteresis sub-States.

One aspect of the present invention is directed to the method of an automated acquisition of a QAM signal by employing a State machine progressing from an initial State to a final State.

In one embodiment of the present invention, the method of an automated acquisition of a QAM signal comprises: (A) Performing an automatic gain control (AGC) operation on the incoming QAM signal to maintain a steady amplitude of the QAM signal; (B) Performing a symbol timing recovery of the input QAM signal by adjusting a sampling clock of the symbol timing recovery loop; (C) Performing a Blind Equalization of the QAM signal without carrier lock to minimize a dispersion error of the received QAM signal constellation as compared with an error-free QAM signal constellation by adjusting a set of coefficients of the equalizer; (D) Performing a carrier recovery of the QAM signal to eliminate a residual carrier frequency error and to eliminate a phase error from the acquired QAM signal; and (E) Performing a decision directed equalization (DDE) of the QAM signal by updating a set of coefficients of the equalizer by using a decision based algorithm.

Another aspect of the present invention is directed to an apparatus for automated acquisition of a QAM signal.

In one embodiment, the apparatus of the present invention further comprises a state machine comprising an AGC State, wherein the State machine in the AGC State is configured to perform an automatic gain control (AGC) operation on the incoming QAM signal to maintain a steady amplitude of the QAM signal, and wherein the AGC State further comprises: a Minimum Sub-State further comprising Coarse Estimate Sub-State; and an AGC Lock Sub-State further comprising Maximum Sub-State.

In one embodiment, the state machine further comprises the Clock 1 State, wherein the State machine in the Clock 1 State is configured to perform an initial symbol timing recovery of the input QAM signal, and wherein the Clock 1 State further comprises: a Minimum Sub-State; and a Maximum Sub-State.

In one embodiment, the state machine further comprises the Clock 2 State, wherein the State machine in the Clock 2 State is configured to perform configured to perform an optimized symbol timing recovery of the input QAM signal, and wherein the Clock 2 State further comprises: a Minimum Sub-State; and a Maximum Sub-State.

In one embodiment, the state machine further comprises the Blind State, wherein the State machine in the Blind State is configured to perform a Blind Equalization of the QAM signal without carrier lock to minimize a dispersion error of the received QAM signal constellation as compared with an error-free QAM signal constellation, and wherein the Blind State further comprises a Minimum Sub-State; a Threshold Sub-State further comprising a Maximum Sub-State; and a Hysteresis Sub-State.

In one embodiment, the state machine further comprises a Carrier 1 State, wherein the State machine in the Carrier 1 State is configured to perform a carrier recovery of the QAM signal to eliminate a residual carrier frequency error, and wherein the Carrier 1 State further comprises: a Minimum Sub-State; a Threshold Sub-State further comprising a Maximum Sub-State further comprising a Sweep Sub-State; and a Hysteresis Sub-State.

In one embodiment, the state machine further comprises a Carrier 2 State, wherein the State machine in the Carrier 2 State is configured to perform a carrier recovery of the QAM signal to eliminate a residual carrier phase error, and wherein the Carrier 2 State further comprises: a Minimum Sub-State; a Threshold Sub-State further comprising a Maximum Sub-State; and a Hysteresis Sub-State.

In one embodiment, the state machine further comprises a DDE 1 State, wherein the State machine in the DDE 1 State is configured to perform a decision directed equalization (DDE) of the QAM signal, wherein an equalizer coefficients are updated by using a decision directed (DDE) algorithm, and wherein the decision directed algorithm (DDE) uses a step size coefficient to determine an error feedback from a carrier loop to the equalizer, and wherein the DDE 1 State further comprises: a Minimum Sub-State; a Threshold Sub-State further comprising a Maximum Sub-State; and a Hysteresis Sub-State.

In one embodiment, the state machine further comprises a DDE 2 State, wherein the State machine in the DDE 2 State is configured to perform a decision directed equalization (DDE) of the QAM signal by re-adjusting the step size coefficient in the DDE algorithm to optimize the error feedback from the carrier loop to the equalizer, and wherein the DDE 2 State further comprises a Minimum Sub-State; a Threshold Sub-State further comprising a Maximum Sub-State; and a Hysteresis Sub-State.

In one embodiment, the state machine further comprises a Tracking State, wherein the State machine in the Tracking State is configured to perform tracking of the QAM signal by re-adjusting the step size coefficient in the DDE algorithm; and wherein the Tracking State further comprises: a Minimum Sub-State; and a Threshold Sub-State further comprising a Maximum Sub-State.

Finally, in one embodiment, the state machine further comprises a Reset State, wherein the State machine is configured to cycle back to the Reset state to re-acquire a lost QAM signal.

BRIEF DESCRIPTION OF THE DRAWINGS

The aforementioned advantages of the present invention as well as additional advantages thereof will be more clearly understood hereinafter as a result of a detailed description of a preferred embodiment of the invention when taken in conjunction with the following drawings.

FULL DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Figure 1:
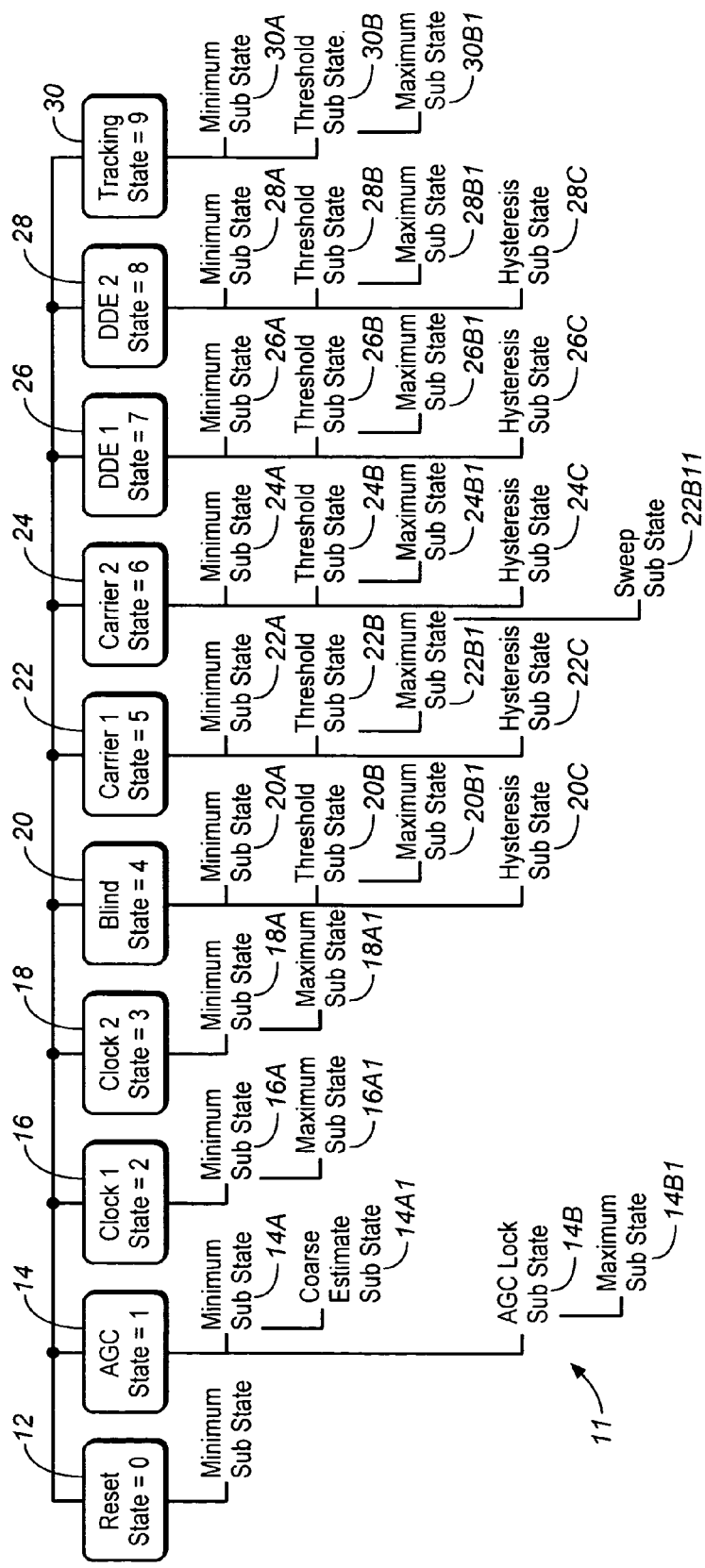
FIG. 1 is a topological diagram of a State machine having 10 States with all sub-States from an initial State "1" to a final State "9" including the reset State "0" for the purposes of the present invention.

In one embodiment of the present invention, FIG. 1 is a topological diagram 10 that depicts a State machine 11 having 10 States 12 through 30 that is embedded in the modem and that is utilized to implement the method of the present invention of automatic acquisition of an incoming signal by progressing from an initial State "1" 14 to a final State "9" 30. State "0" 12 is a reset State and will be discussed below.

In one embodiment of the present invention, the modem comprises a QAM modem. In another embodiment, the modem comprises a QPSK modem. In one more embodiment, the modem comprises a Phase Shift Key (PSK) modem.

The modem's input signal is a digital signal stream from a digital source or channel encoder. If the modem's input signal is generated by an analog information source, the signal should be first band limited to a bandwidth of B in a low pass filter (LPF) block, before sampling can take place in an analog to digital converter (ADC) block. According to Nyquist's fundamental theorem, the sampling frequency should be equal to or higher than twice the bandwidth B, that is $fc \geq 2B$. If this condition is met, the original bandlimited signal can be recovered from its (1/2B)-spaced sampled representation with the aid of a low-pass filter having a cut-off frequency of B. The analog to digital converter (ADC) takes the bandlimited signal and digitizes it by converting the analog level of each sample to a discrete level. The mapping process that maps the input information bits from the digital source onto the in-phase (I) and quadrature (Q) carriers determines the properties of the modem. The mapping can be represented by the so-called constellation diagram. Due to the instantaneous transitions in the time domain the I-sequence has an infinite bandwidth and would require an infinite channel bandwidth for its transmission. The same is true for the Q-component. Thus, the I and Q signals are bandlimited before transmission in order to contain the spectrum within a limited band and to minimize interference with other users or systems sharing the spectrum. An ideal linear-phase low pass filter with a cut-off Nyquist frequency of fN=fs/2, wherein fs=1/T is the signaling frequency, and wherein T is the signaling interval duration, would retain all the information conveyed by the quadrature components I and Q within a compact frequency band. Due to the linear phase response of the filter all frequency components would exhibit the same group delay. Because such a filter has a sinc function shaped impulse response with equidistant zero-crossings at the sampling instants, it does not result in inter-symbol-interference (ISI). Once the analog I and Q signals have been generated and filtered, they are modulated by an I-Q modulator This process allows both I and Q signals to be transmitted over a single channel within the same bandwidth using quadrature carriers. The I and Q signals are combined and the combined signal is modulated by a radio frequency in the RF mixer, so that the resulting signal has a carrier frequency suitable for the transmission over the channel. The RF demodulator mixes the received signal down to the IF for the I-Q demodulator, wherein the recovered IF spectrum is similar to the transmitted one but with the additive noise floor. The I-Q demodulation takes place in the reverse order to the I-Q modulation process. The signal is split into two paths, with each path being mixed down with IF's that are 90 degrees apart. The recovered I component should be near identical to that transmitted, with the only difference being caused by noise. Once the analog I and Q components have been recovered, they are digitized by the bit detector in the DEMAP block. The bit detector determines the most likely bit (MLB) transmitted by sampling the I and Q signals at the correct sampling instants and compares them to the legitimate I and Q values. The recovered bits are passed to the DAC. If the channel's SNR is high enough, the reconstructed digital signal is identical to the original input signal. Provided the DAC operates at the same frequency and with the same number of bits as the input ADC, the analog output signal after low pass filtering with a cut-off frequency of B in block LPF, is a close replica of the input signal. The right time to sample is a function of the clock frequency at the transmitter. The data clock should be regenerated upon recovery of the carrier. Any error in the clock recovery will increase the BER. Both clock and carrier recovery systems attempt to derive information about timing from the received signal. While carrier recovery is only necessary in a coherent demodulation system, clock recovery is required in all schemes, and accurate clock recovery is essential for reliable data transmission. Clock recovery attempts to synchronize the receiver clock with the baseband symbol rate transmitter clock, wherein carrier recovery endeavors to align the receiver local oscillator with the transmitted carrier frequency. The above-given prior art introduction to the QAM modems can be found in "Modem Quadrature Amplitude Modulation", by W. T. Webb and L. Hanzo, published by Pentech Press Limited in 1994, in Great Britain.

Referring still to FIG. 1, in one embodiment of the present invention, the modem comprises the QAM modem, and the embedded controller is configured to control the QAM modem according to the control algorithm by using the State machine 11. In general, the QAM modem acquires and tracks a signal through an automatic acquisition operation. As was Stated above, there are 10 States that define the acquisition operation. Each operating State is defined by control parameters that determine how long to remain in the current operating State and when control is passed to the next State. These control parameters are defined by the user through the host interface. The control parameters are defined for each of the 10 States. The modem selects each parameter based on its current operating State. The signal is characterized and conditioned through each State until the final idle State "9" achieved. In the event of the loss of signal, the modem reacquires the signal by cycling back to State "0".

In one embodiment of the present invention, the method of an automated acquisition of a QAM signal is performed by the State machine 11 that uses the control algorithm. In one embodiment of the present invention, the control algorithm comprises at least the following steps:
(A) Performing an automatic gain control (AGC) operation on an incoming QAM signal to maintain steady amplitude of the QAM signal;
(B) Performing a symbol timing recovery of the input QAM signal by adjusting a sampling clock of the symbol timing recovery loop;
(C) Performing a Blind Equalization of the QAM signal without carrier lock to minimize a dispersion error of the received QAM signal constellation as compared with an error-free QAM signal constellation by adjusting a set of coefficients of the equalizer;
(D) Performing a carrier recovery of the QAM signal to eliminate a residual carrier frequency error and to eliminate a phase error from the acquired QAM signal;
and
(E) Performing a decision directed equalization (DDE) of the QAM signal by updating a set of coefficients of the equalizer by using a decision based algorithm.

In one embodiment of the present invention, the State machine 11 performs the step (A) of an automatic gain control (AGC) operation on an incoming QAM signal to maintain a steady amplitude of the QAM signal while being in State "1" 14.

In the U.S. Pat. No. 6,510,188, entitled "ALL DIGITAL AUTOMATIC GAIN CONTROL CIRCUIT" by Isaksen et al., a digital automatic gain control (AGC) system is fully disclosed. The AGS system, of '188 patent comprises an AGC amplifier configured to scale an input signal by a scale factor, and configured to generate an analog scaled input signal. An analog-to-digital (A/D) converter is configured to sample and convert the analog scaled input signal into a digital scaled input signal. The frequency down converted digital scaled input signal is processed by a power level detector circuit to detect its power level. The logarithmic comparison circuit (LCC) is configured to compare the detected power level of the digital scaled input signal to a predetermined reference signal and configured to generate a digital error signal. Finally, an error processing circuit is configured to process the digital error signal and configured to determine the scale factor of the AGC circuit. The test results show that for any applicable QAM constellation the AGC circuit of the present invention can control the broadest fades (or decreases) in the power level of the input signal with accuracy up to 200 dB/per second. The '188 patent is assigned to the assignee of the present patent application and is incorporated herein in its entirety. The "188 patent provides an enabling disclosure for the AGC operation performed by the State machine 11 in step (A).

Briefly, during this State "1", the power at the output of the Nyquist filter is computed, averaged and compared to a target level that represents the average power in the constellation. The error between the average power in the constellation and the target power level is output to the AGC DAC port to maintain steady signal amplitude. Optionally for this State, a coarse frequency measurement can be performed. This measurement is performed so that corrections can be applied to frequency offsets that occur due to a drift in frequency over a long period of time.

More specifically, referring still to FIG. 1, in one embodiment of the present invention, the State machine 11 enters the sub-State 14B-AGC Lock Sub State to perform the step of automatic gain control (AGC) operation. In this embodiment, the step of performing the automatic gain control (AGC) operation further comprises the step of computing, averaging and comparing to a target level an output power at Nyquist filter. The output power represents the average power in the QAM signal constellation, wherein an error signal between the average power in the QAM signal constellation and the output target power level is used to maintain steady QAM signal amplitude. In this embodiment, the State machine 11 further enters the sub-State 14B1-Maximum Sub-State.

In another embodiment of the present invention, the State machine 11 enters the sub-State 14A Minimum Sub-State to perform the step of the automatic gain control (AGC) operation. In this embodiment, the State machine 11 further enters the sub-State 14A1-Coarse Estimation Sub-State-to perform the step of automatic gain control (AGC) operation. In this sub-State further comprises the coarse frequency estimation of the QAM signal frequency drift over a long period of time is performed to obtain a set of frequency corrections, and further to apply the set of frequency corrections to a set of frequency offsets in the coarse frequency loop. The QAM signal frequency drifts over a long period of time due to effects of aging, temperature changes, humidity changes, etc.

The coarse frequency estimate is optional and is selected by the user through the host interface. The 3 parameters entered by the user for the coarse frequency estimate are as follows: coarse estimate enable flag, coarse estimate count, and coarse symbol count. If the coarse estimate enable flag is set, the coarse estimate is performed. The coarse estimate begins by averaging the input symbols through the front end tuner. The number of symbols to average is determined by the coarse estimate symbol count. This process continues until the threshold number of coarse estimates is exceeded.

Figure 2:
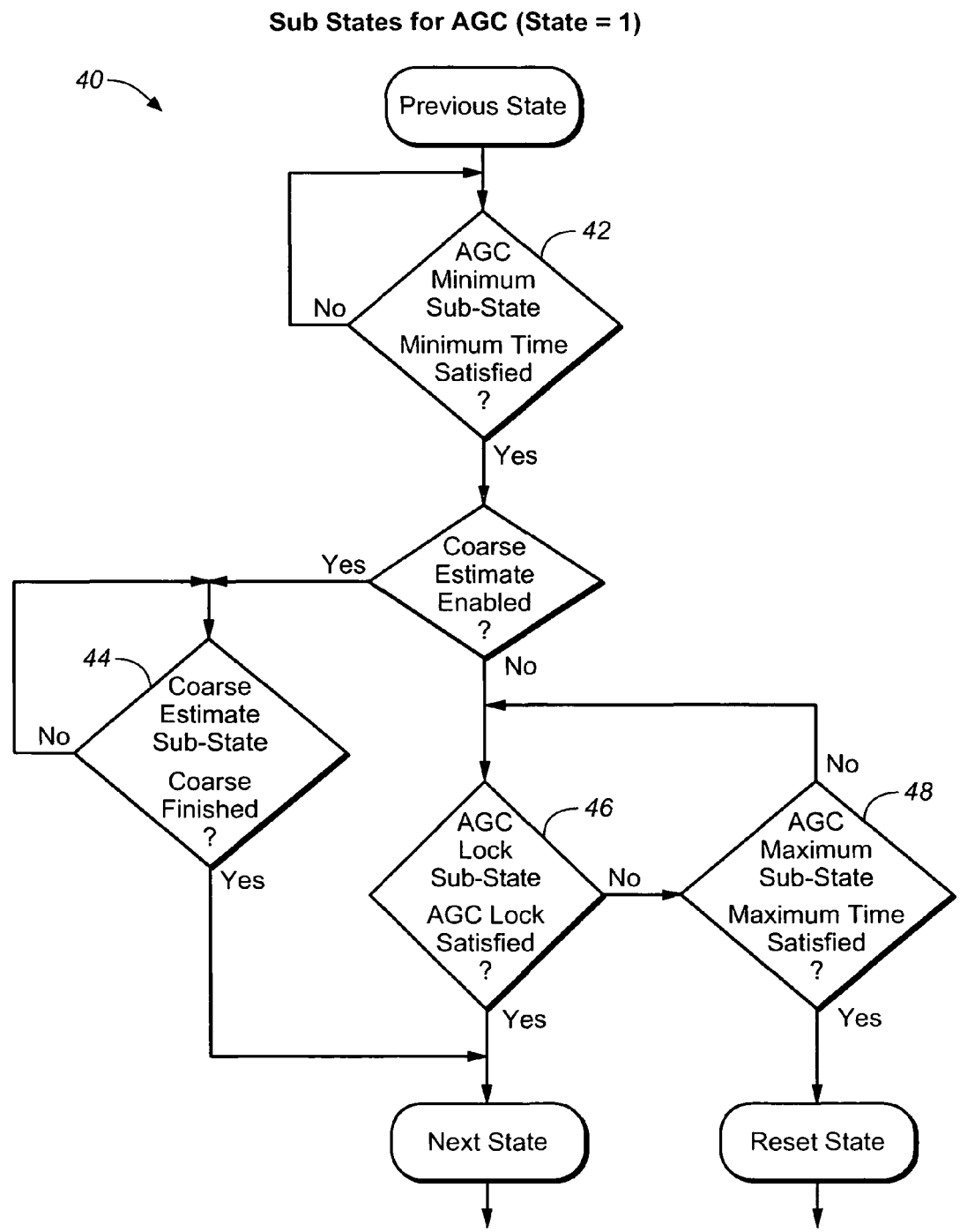
FIG. 2 illustrates four loop tests for the State "1" of FIG. 1 for the purposes of the present invention.

More specifically, as shown in FIG. 2, in one embodiment of the present invention, the State machine 11 in State "1" performs the following loop tests:

The loop test 42 for AGC minimum Sub-State 14A (of FIG. 1):

Is minimum time satisfied?

The loop test 44 for AGC Coarse Estimation Sub-State 14A1 (of FIG. 1):

Is Coarse Finished?

The loop test 46 for the AGC Lock Sub-State 14B (of FIG. 1):

Is AGC Lock Satisfied?

The loop test 48 for the AGC Maximum Sub-State 14B1 (of FIG. 1):

Is maximum time satisfied?

The next step is the step (B) of performing a symbol timing recovery of the input QAM signal by adjusting a sampling clock of the symbol timing recovery loop.

In the U.S. Pat. No. 6,278,741, entitled "TIMING RECOVERY CIRCUIT IN QAM MODEMS" by David Isaksen et al., a timing recovery system and method for QAM signals having different symbol rates are disclosed. After sampling the QAM baseband signal, a symbol timing recovery logic including a generator of a weighting function is utilized to develop a local error signal. The local error signal averaged over a predetermined time period is utilized to make a global decision regarding the sampling point position relative to the baseband signal maximum/minimum. The patent '741 is incorporated by reference herein and is assigned to the assignee of the present patent application. The '741 patent provides the enabling disclosure of the process of the symbol timing recovery used in the step (B) by the control algorithm of the present invention.

In one embodiment of the present invention, the State machine 11 enters the Minimum Sub-State 16A (of FIG. 1) to perform the step of symbol timing recovery of the input QAM signal. Briefly, in this Minimum Sub-State 16A the symbol loop process adjusts the sampling clock or the interpolated sample to the ideal sample point. The symbol loop is adjusted by frequency and phase coefficients defined by the user through the host interface. In one embodiment of the present invention, the State machine 11 further enters the Maximum Sub-State 16A1 (of FIG. 1) to perform the step of symbol timing recovery of the input QAM signal by adjusting the sampling clock of the symbol timing recovery loop (see '741 patent).

Figure 3:
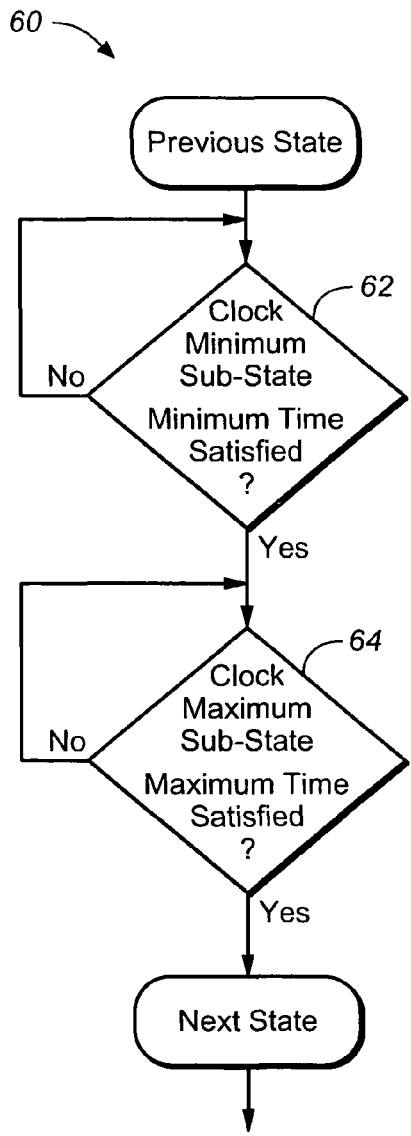
FIG. 3 depicts two loop tests for the State "2" of FIG. 1 for the purposes of the present invention.

As shown in FIG. 3, the State "2" (16 of FIG. 1) comprise two loop tests:

The loop test 62 for the Clock Minimum Sub-State 16A (of FIG. 1):

Is minimum time satisfied?

The loop test 64 for the Clock Maximum Sub-State 16A1 (of FIG. 1):

Is maximum time satisfied?

In one embodiment of the present invention, the State machine 11 enters the State "3" 18 (of FIG. 1) in order to optimize the symbol timing recovery of the input QAM signal.

Briefly, during this State "3" the symbol timing recovery is continued. The symbol loop process is the same as for State "2", however, the symbol loop can be readjusted for this State for further refinement.

In one embodiment of the present invention, the State machine 11 enters the State "3" (of FIG. 1) in order to perform symbol timing recovery of the input QAM signal by re-adjusting the sampling clock of the symbol timing recovery loop to optimize the symbol timing recovery of the input QAM signal.

In one embodiment of the present invention, the State machine 11 enters the State Minimum Sub-State 18A (of FIG. 1) in order to perform symbol timing recovery of the input QAM signal by adjusting the set of frequency coefficients.

In another embodiment of the present invention, the State machine 11 enters the State Maximum Sub-State 18A1 (of FIG. 1) in order to perform symbol timing recovery of the input QAM signal by adjusting the set of phase coefficients of the symbol loop via a host interface, according to '741 patent.

Figure 4:
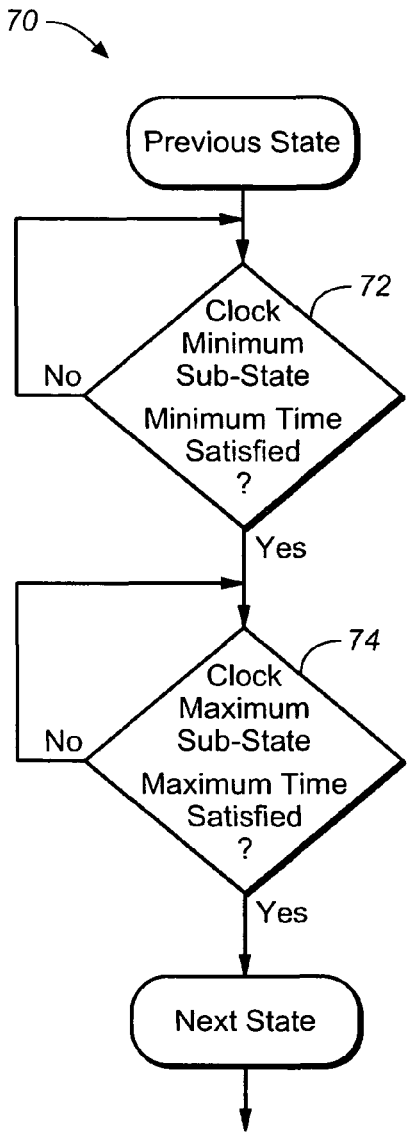
FIG. 4 shows two loop tests for the State "3" of FIG. 1 for the purposes of the present invention.

As shown in FIG. 4, the State "3" (18 of FIG. 1) comprise two loop tests:

The loop test 72 for the Clock Minimum Sub-State 18A (of FIG. 1):

Is minimum time satisfied?

The loop test 74 for the Clock Maximum Sub-State 18A1 (of FIG. 1):

Is maximum time satisfied?

In one embodiment of the present invention, at the next step (C), the control algorithm is configured to perform a Blind Equalization operation on QAM signal without carrier lock to minimize a dispersion error of the received QAM signal constellation (as compared with an error-free QAM signal constellation) by adjusting a set of coefficients of the equalizer.

The process of Blind Equalization of the QAM signal without carrier lock is fully disclosed in the U.S. Pat. No. 7,079,605, "FREQUENCY ESTIMATION BASED ON CONSTELLATION ERROR IN QAM MODEMS", issued on Jul. 18, 2006. This patent is incorporated herein in its entirety and is assigned to the assignee of the present patent application. The method for frequency estimation in a QAM modem according to the patent '605 comprises the following steps: (1) receiving in phase and quadrature components of a QAM symbol from a carrier recovery block; (2) mapping received QAM symbol to a nearest QAM plant point using a slicer; (3) determining an instant error power of the received QAM point; (4) averaging the instant error power over a plurality of incoming QAM symbols in time domain; (5) excluding a DC component from the averaged error power; (6) translating the averaged error power without DC component from time domain into a frequency domain in order to determine the frequency spectrum of the averaged error power; (7) selecting the frequency spectrum component of the averaged error power with the maximum amplitude by using a peak detection; and (8) determining the frequency offset as the maximum frequency spectrum component of the averaged error power.

In one embodiment of the present invention, the State machine 11 (of FIG. 1) enters the State "4" 20 to perform the step (C1) of Blind Equalization of the QAM signal without carrier lock. Briefly, the State machine 11 performs the process of Blind Equalization by adapting the equalizer coefficients without carrier lock so that the dispersion error is minimized. The equalizer performs a constant modulus update of the coefficients.

More specifically, in this embodiment, the step (C1) of performing the Blind Equalization of the QAM signal without carrier lock further comprises the step (C1, 1) of substantially continuously performing a modulus update of the set of equalizer coefficients. This step is fully described in the referred above patent '605.

The Blind State "4" (20 of FIG. 1) comprises four Sub-States: Minimum Sub-State 20A, Threshold Sub-State 20B including Maximum Sub-State 20B1, and Hysteresis Sub-State 20C.

Figure 5:
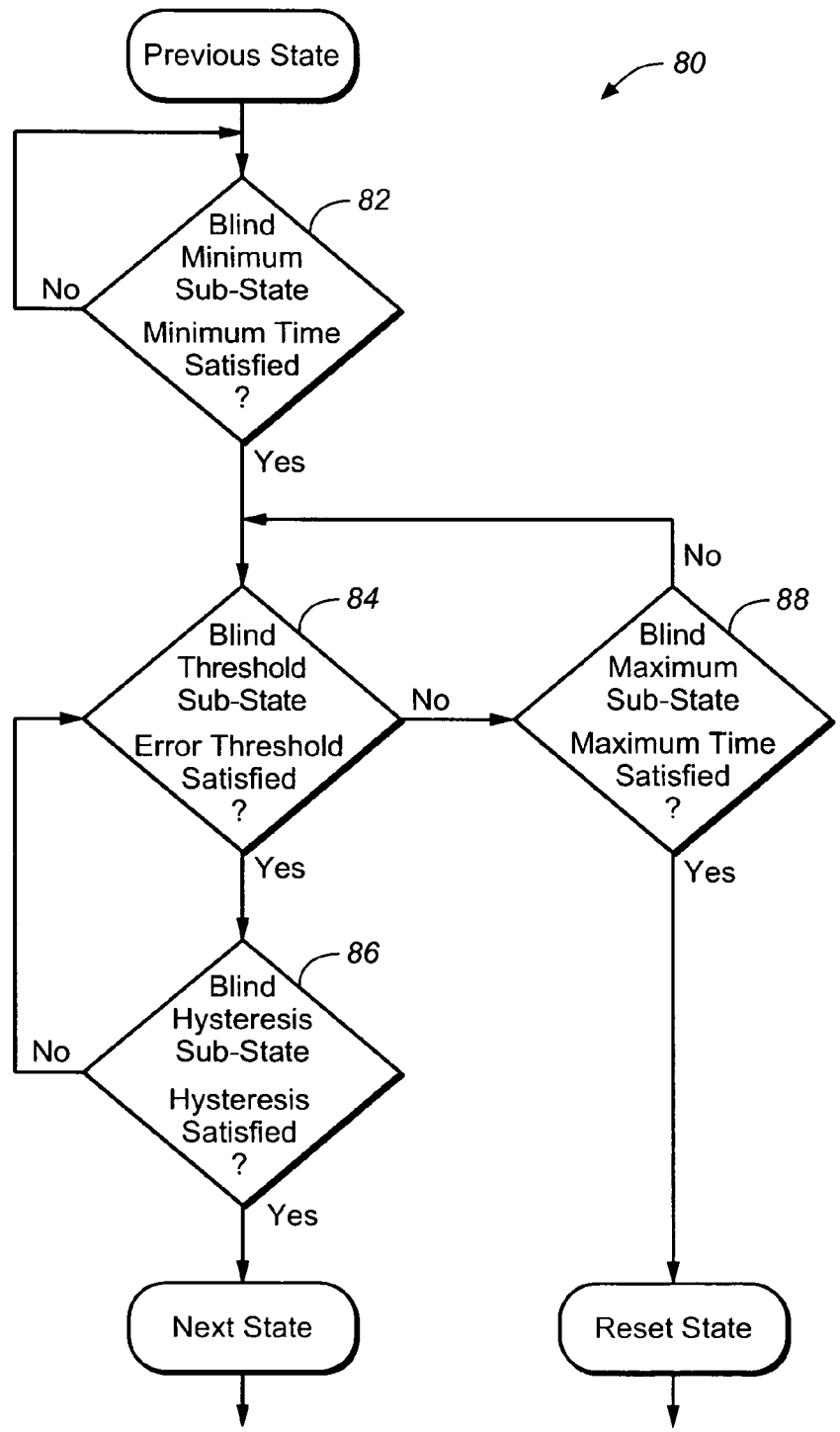
FIG. 5 illustrates four loop tests for the State "4" of FIG. 1 for the purposes of the present invention.

As shown in FIG. 5, the State "4" (20 of FIG. 1) comprise four loop tests:

The loop test 82 for the Blind Minimum Sub-State 20A (of FIG. 1):
Is minimum time satisfied?
The loop test 84 for the Blind Threshold Sub-State 20B (of FIG. 1):
Is error threshold satisfied?
The loop test 86 for the Blind Hysteresis Sub-State 20C (of FIG. 1):
Is hysteresis satisfied?
The loop test 88 for the Blind Maximum Sub-State 20B1 (of FIG. 1):
Is maximum time satisfied?

In one embodiment of the present invention, in the hysteresis sub-State the State machine of the present invention utilizes the dwell count to further determine the State to State transition. A dwell count is maintained and incremented for every symbol beyond the minimum symbol count. The dwell count is reset to zero before transitioning to the next State. The dwell count is compared to the dwell count limit defined by the user. The dwell count limit is unique to each State. For example, if the minimum count is met and the error threshold is met, a State transition between sub-States 20B and 20C occurs if the dwell count exceeds the dwell count limit.

In one embodiment of the present invention, at the next step (D), the control algorithm performs a carrier recovery of the QAM signal to eliminate a residual carrier frequency error and to eliminate a phase error from the acquired QAM signal.

The process of carrier recovery of the QAM signal to eliminate a residual carrier frequency error and to eliminate a phase error from the acquired QAM signal is fully disclosed in the U.S. Pat. No. 6,904,098, "LINEAR PHASE ROBUST CARRIER RECOVERY FOR QAM MODEMS" issued on Jun. 7, 2005. This patent is incorporated in its entirety and is assigned to the assignee of the present patent application. According to patent '098 a method of carrier tracking for a QAM demodulator including an adaptive equalizer comprises the following steps: (A) sampling a QAM signal received from a transmission channel; (B) recovering a symbol clock function from the sampled QAM signal; (C) applying the sampled QAM signal to the adaptive equalizer in order to obtain a QAM equalized signal in a Blind Equalization (BE) mode; (D) using a slicer to locate a nearest plant point for the QAM Blind equalized signal for each recovered symbol clock; (E) using a complex conjugate multiplier to obtain an instantaneous in phase component and an instantaneous quadrature component of a phase angle error signal; (F) using a linear phase detector to obtain an instantaneous phase angle error for each symbol clock; (G) averaging the instantaneous phase angle error signal by using a carrier loop filter; (H) using a complex multiplier to insert an inverse of the averaged phase angle error signal into the QAM Blind equalized signal to compensate for the carrier phase angle error; and (I) repeating the steps (D-H) to close a carrier frequency loop.

Patent '098 provides the enabling disclosure of the process of a carrier recovery of the QAM signal to eliminate a residual carrier frequency error and to eliminate a phase error from the acquired QAM signal. This process is used by the control algorithm of the present invention.

In one embodiment of the present invention, the State machine 11 of FIG. 1, enters the State "5" 22 to perform the Carrier Acquisition 1. Briefly, during this State "5" the carrier recovery is continued. The carrier loop process eliminates the residual carrier frequency and phase error from the signal. The carrier loop is adjusted by frequency and phase coefficients defined by the user through the host interface. Optionally for this State, a frequency sweep can be performed. The frequency sweep is used if the frequency offset of the signal is greater than the acquisition bandwidth of the carrier recovery loop.

Figure 6:
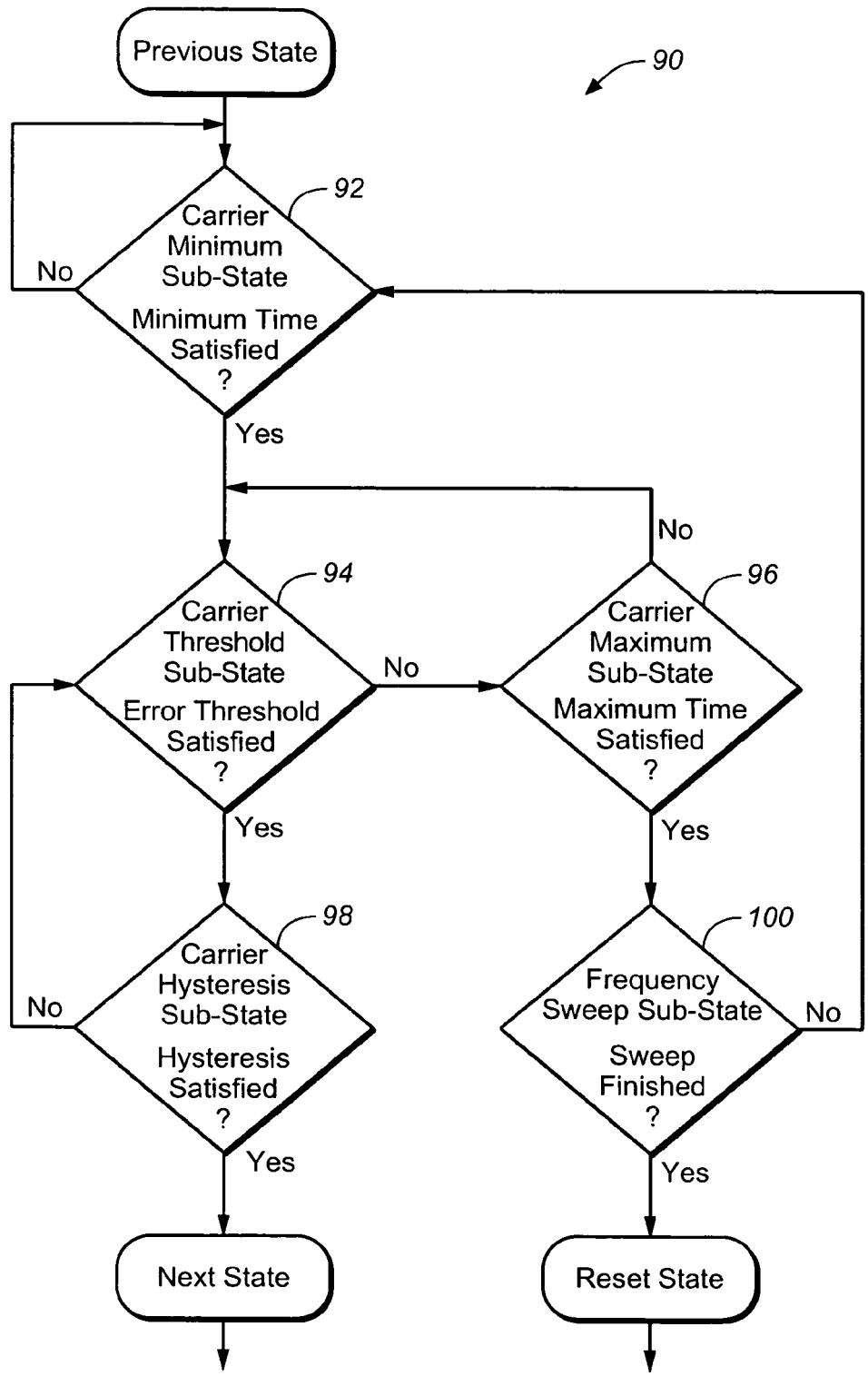
FIG. 6 depicts five loop tests for the State "5" of FIG. 1 for the purposes of the present invention.

As shown in FIG. 6, the State "5" comprises five loop tests:
The loop test 92 for Carrier Minimum Sub-State 22A:
Is minimum time satisfied?
The loop test 94 for Carrier Threshold Sub-State 22B:
Is error threshold satisfied?
The loop test 96 for Carrier Maximum Sub-State 22B1:
Is minimum time satisfied?
The loop test 100 for Frequency Sweep Sub-State 22B11:
Is sweep finished?
The loop test 98 for Hysteresis Sub-State 22C:
Is hysteresis satisfied?

In one embodiment of the present invention, after blind equalization is performed in State "4", the carrier acquisition (in State "5") operates with all the parameters above and optionally with a frequency sweep (loop test 100). The frequency sweep uses 4 parameters for its operation. A frequency sweep enable flag, a frequency sweep delta, and an upper and lower frequency sweep limit is defined by the user and are only used in State "5". Also within State "5", a sweep frequency is maintained and outputted to the carrier loop. The sweep frequency is initially set to the lower frequency sweep limit in State "4". The frequency sweep only takes effect if the maximum symbol count is exceeded. If the maximum symbol count is exceeded and the frequency sweep enable flag is set, the sweep frequency is updated by adding the sweep delta. This process to continues until either the error threshold is met or the upper sweep frequency limit is exceeded. If the upper sweep frequency limit is exceeded, the State transitions back to State "0" (12 of FIG. 1).

In one embodiment of the present invention, the State machine 11 of FIG. 1, enters the State "6" 24 (of FIG. 1) to perform the Carrier Acquisition 2. Briefly, during this State "6" the carrier recovery is performed. The carrier loop process is the same as for State 5 except for the frequency sweep. The carrier loop can be readjusted for this State for further refinement.

More specifically, in one embodiment of the present invention, the step (D3) of performing the carrier recovery of the QAM signal while the State machine stays in the State "6" 24 further comprises the step (D3, 1) of re-adjusting the set of frequency coefficients and the set of phase coefficients of the carrier loop to optimize the carrier acquisition of the QAM signal. The full disclosure is given in patent '098.

Figure 7:
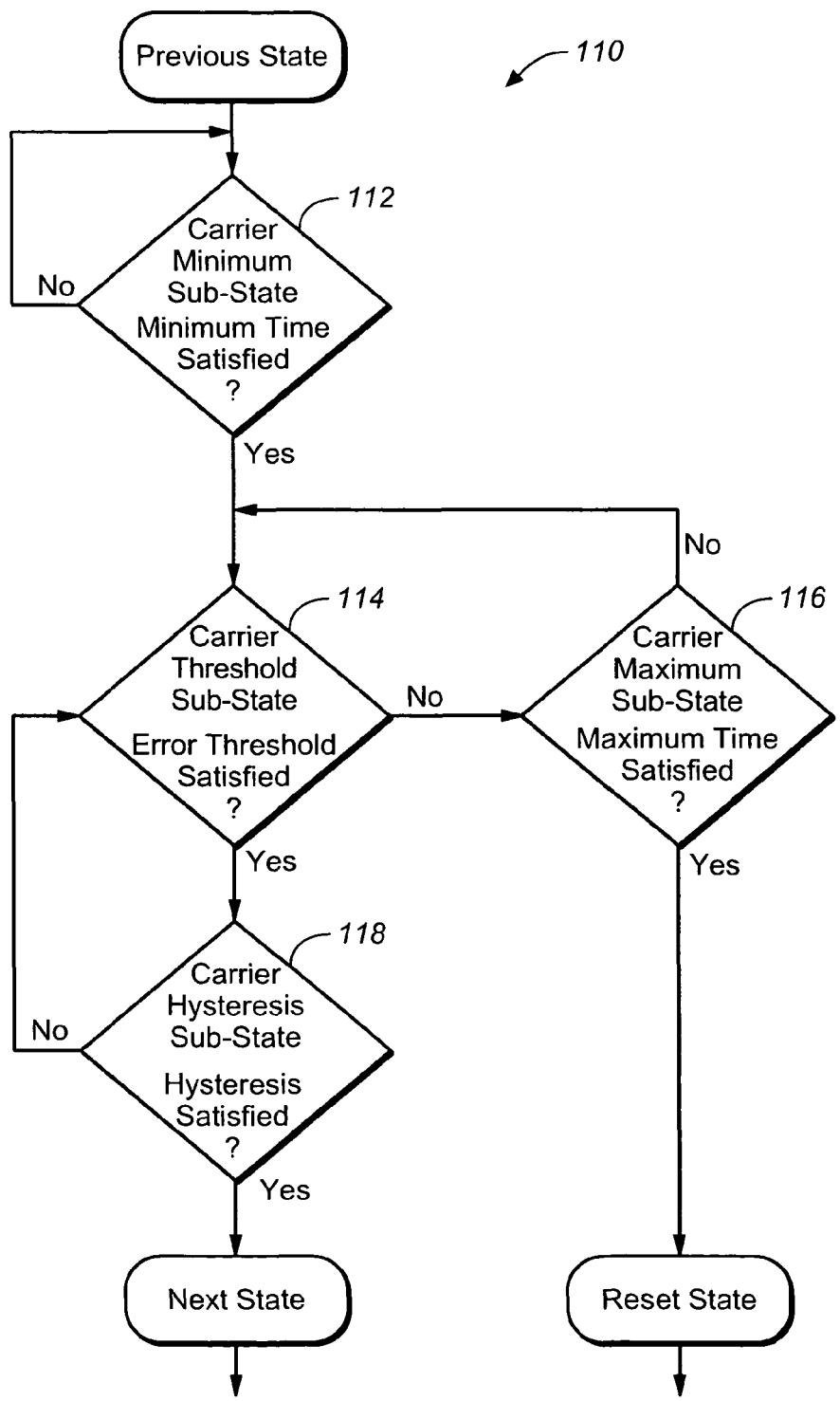
FIG. 7 illustrates four loop tests for the State "6" of FIG. 1 for the purposes of the present invention.

As shown in FIG. 7, the State "6" (24 of FIG. 1) comprises four loop tests:
The loop test 112 for the Carrier Minimum Sub-State 24A (of FIG. 1):
Is minimum time satisfied?

The loop test 114 for the Carrier Threshold Sub-State 24B (of FIG. 1):

Is error threshold satisfied?

The loop test 116 for the Carrier Maximum Sub-State 24B1 (of FIG. 1):

Is maximum time satisfied?

The loop test 118 for the Carrier Hysteresis Sub-State 24C (of FIG. 1):

Is hysteresis satisfied?

Finally, in one embodiment of the present invention, the control algorithm performs the step (E) of decision directed equalization (DDE) of the QAM signal by updating a set of coefficients of the equalizer and by using a decision based algorithm.

The method to perform the step of decision directed equalization (DDE) of the QAM signal by updating a set of coefficients of the equalizer and by using a decision based algorithm is fully disclosed in the referred above patent '098.

In one embodiment of the present invention, the step (E) of performing the decision directed equalization (DDE) of the QAM signal causes the State machine to enter State "7" 26 (of FIG. 1) to perform the step (E1) of decision directed equalization (DDE) of the QAM signal. Briefly, during this State "7" the decision directed equalization is performed. The equalizer coefficients are updated by using a decision directed (DDE) algorithm. The decision directed algorithm (DDE) uses a step size coefficient to determine the error feedback from the carrier loop to the equalizer.

More specifically, in this embodiment, the step (E1) of decision directed equalization (DDE) of the QAM signal while the State machine stays in State "7" further comprises the step (E1, 1) of using a step size coefficient in the DDE algorithm to determine the error feedback from the carrier loop to the equalizer. This step (E1) is fully disclosed in the referred above patent '098.

Figure 8:
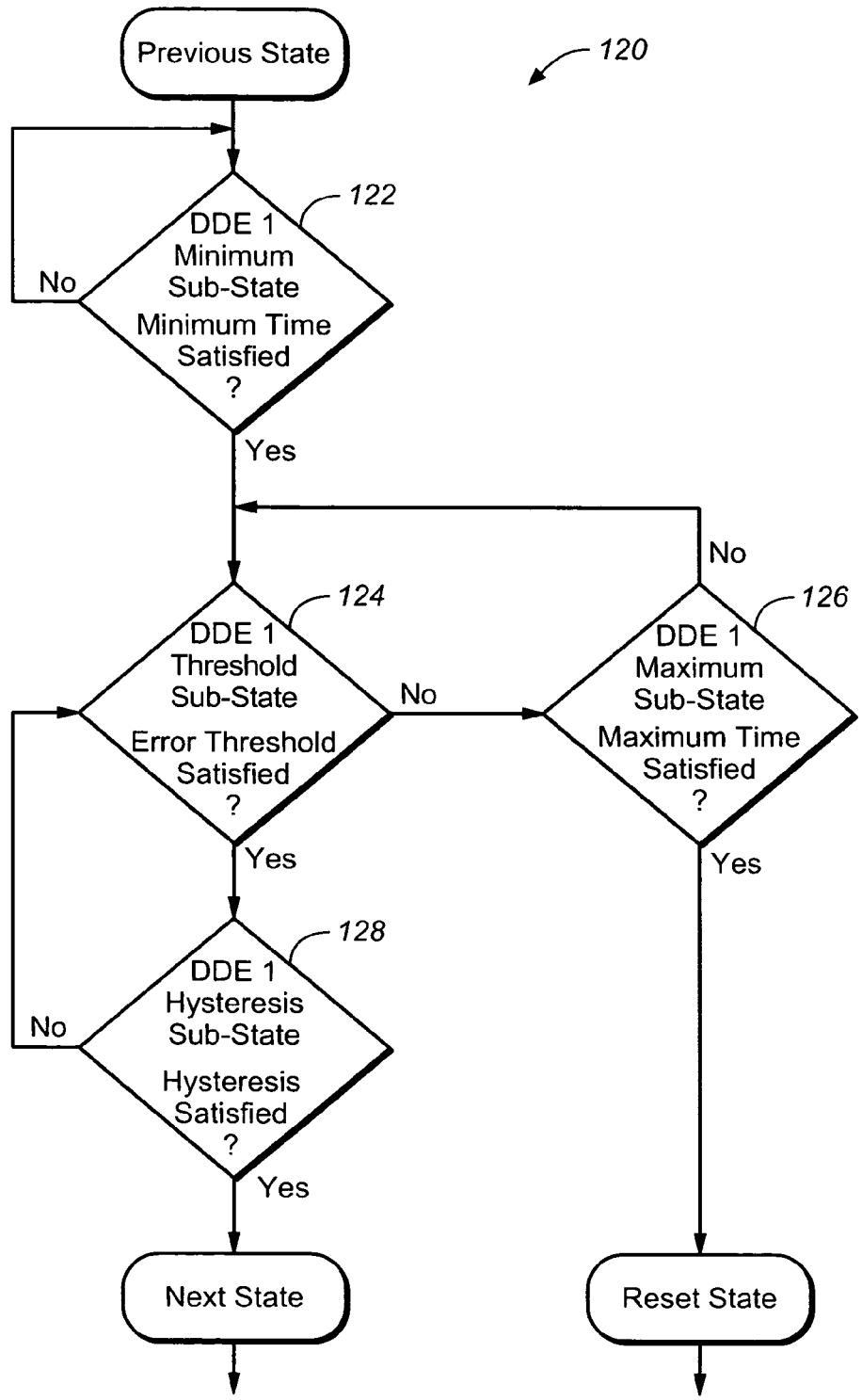
FIG. 8 depicts four loop tests for the State "7" of FIG. 1 for the purposes of the present invention.

As shown in FIG. 8, the State "7" (26 of FIG. 1) comprises four loop tests:

The loop test 122 for the DDE1 Minimum Sub-State 26A (of FIG. 1):

Is minimum time satisfied?

The loop test 124 for the DDE1 Threshold Sub-State 26B (of FIG. 1):

Is error threshold satisfied?

The loop test 126 for the DDE1 Maximum Sub-State 26B1 (of FIG. 1):

Is maximum time satisfied?

The loop test 128 for the DDE1 Hysteresis Sub-State 26C (of FIG. 1):

Is hysteresis satisfied?

In another embodiment of the present invention, the step (E) of performing the decision directed equalization (DDE) of the QAM signal causes the State machine to enter State "8" 28 (of FIG. 1) to perform the step (E2) of decision directed equalization (DDE) of the QAM signal. Briefly, during this State "8" the decision directed equalization is continued. The Equalizer coefficients are updated the same way as they were updated when the State machine was in State 7. But, the step size coefficients are readjusted for the State "8" for further refinement of the feedback error.

More specifically, in this embodiment, the step (E2) of decision directed equalization (DDE) of the QAM signal while the State machine is in State "8" further comprises the step (E2, 1) of re-adjusting the step size coefficient in the DDE algorithm to optimize the error feedback from the carrier loop to the equalizer. This step (E2) is fully disclosed in the referred above patent '098.

Figure 9:
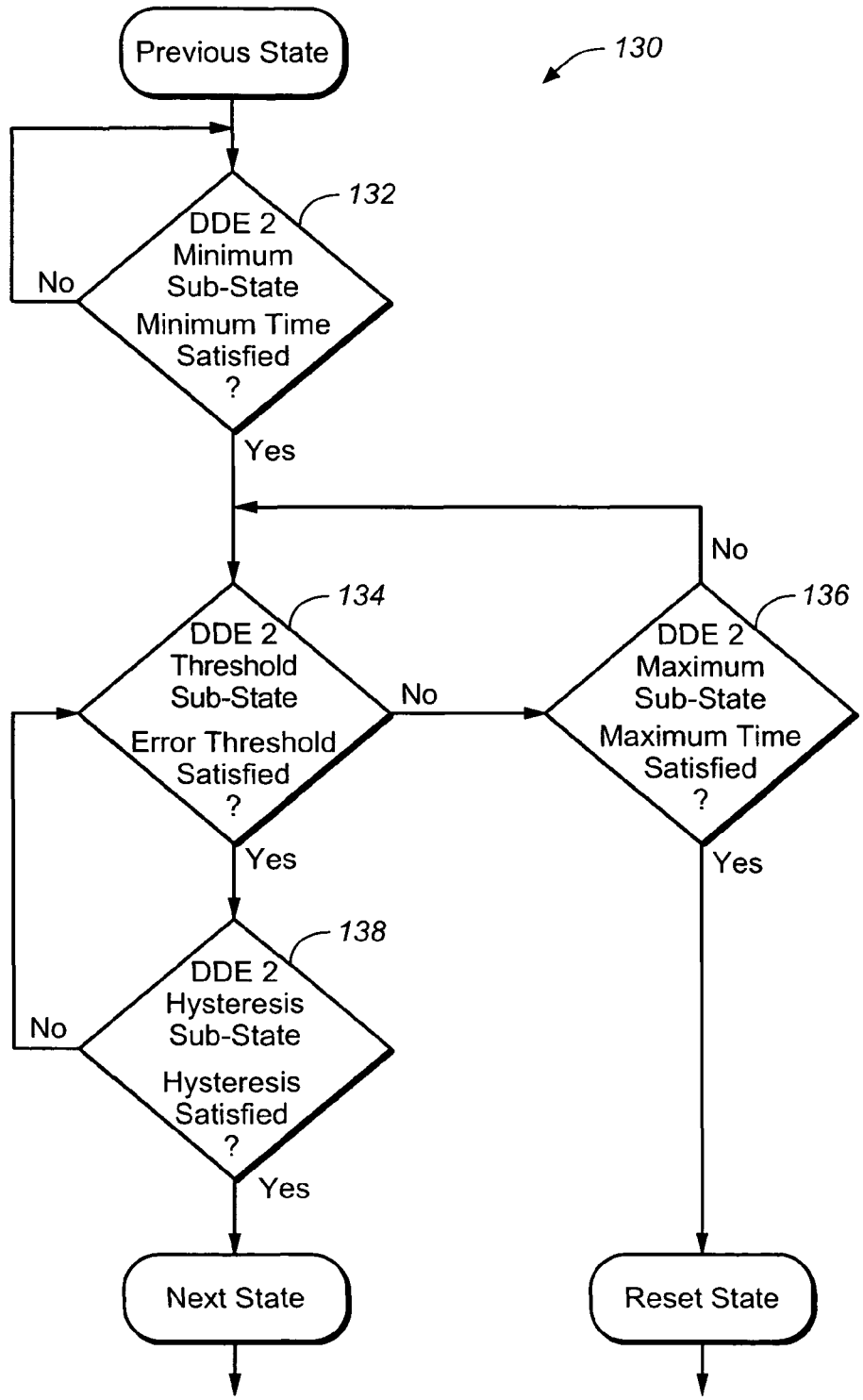
FIG. 9 shows four loop tests for the State "8" of FIG. 1 for the purposes of the present invention.

As shown in FIG. 9, the State "8" (28 of FIG. 1) comprises four loop tests:

The loop test 132 for the DDE2 Minimum Sub-State 28A (of FIG. 1):

Is minimum time satisfied?

The loop test 134 for the DDE2 Threshold Sub-State 28B (of FIG. 1):

Is error threshold satisfied?

The loop test 136 for the DDE2 Maximum Sub-State 28B1 (of FIG. 1

Is maximum time satisfied?

The loop test 138 for the DDE2 Hysteresis Sub-State 28C (of FIG. 1):

Is hysteresis satisfied?

In one more embodiment of the present invention, the step (E) of performing the decision directed equalization (DDE) of the QAM signal causes the State machine to enter a tracking State "9" 30 (of FIG. 1) to perform the step (E3) of decision directed equalization (DDE) of the QAM signal.

In this embodiment, the step (E3) of decision directed equalization (DDE) of the QAM signal while the State machine stays in State "9" further comprises the step (E3, 1) of tracking the QAM signal by re-adjusting the step size coefficient in the DDE algorithm. This step (E3) is fully disclosed in the referred above patent '098.

Figure 10:
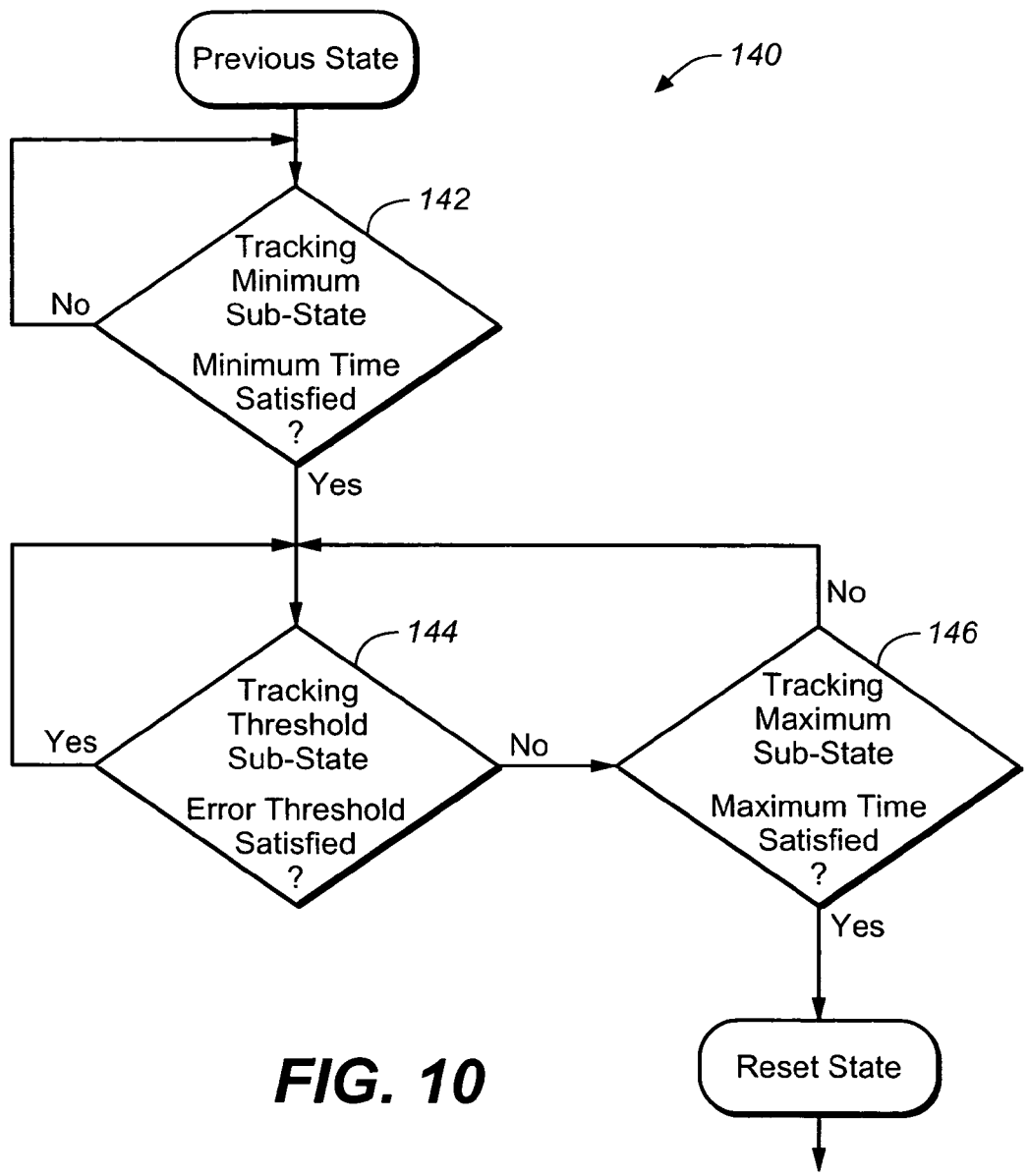
FIG. 10 illustrates three loop tests for the State "9" of FIG. 1 for the purposes of the present invention.

As shown in FIG. 10, the State "9" (28 of FIG. 1) comprises three loop tests:

The loop test 142 for the Tracking Minimum Sub-State 30A (of FIG. 1):

Is minimum time satisfied?

The loop test 144 for the Tracking Threshold Sub-State 30B (of FIG. 1):

Is error threshold satisfied?

The loop test 146 for the Tracking Maximum Sub-State 30B1 (of FIG. 1):

Is maximum time satisfied?

In one embodiment of the present invention, the algorithm employed by the State machine 11 (of FIG. 1) performs the additional step (F) of cycling the State machine 11 back to State "0" 12 to re-acquire a lost QAM signal. The modem also is automatically set to State 0 upon power up. During this State, all soft resets are asserted to zero-out all accumulators and filter delay lines.

For each State, there are control parameters that determine the State to State transition. More specifically, (a) Minimum Symbol Count determines the minimum number of symbols that is maintained per State, (b) Maximum Symbol Count determines the maximum number of symbols that is maintained per State, (c) error threshold parameter defines a limit to which the measured constellation error is compared, (d) dwell count parameter determines the number of symbols the error threshold should meet before allowing a State transition, (e) frequency sweep parameter allows the carrier recovery loop to search for frequency offsets beyond the carrier loop acquisition range, (f) coarse frequency parameter allows the front end carrier loop filter to remove frequency offsets due to slowly varying temperature and aging effects, and (g) AGC lock set parameter, Configuring the above parameters directly determines how quickly the modem acquires a signal or transitions from State to State. The modem requires that the minimum symbol count, the maximum symbol count, the error threshold, and the dwell count be set. However, the values assigned to these parameters can effectively bypass a State or reduce the amount of time the modem is in that State.

For instance, setting the minimum and maximum symbol count to zero allows the modem to bypass a State. Likewise, setting the error threshold to a low value and the dwell count to zero allows the modem to easily achieve the State conditions and continue with the next State. Practically, the values are dictated by the desired operating conditions and the type of signal to demodulate. The programmability of the modem gives the user a flexible means for achieving a signal acquisition.

The foregoing description of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. An apparatus for automated acquisition of a quadrature amplitude modulation (QAM) signal comprising:
   a means (A) for Performing an automatic gain control (AGC) operation on said incoming QAM signal to maintain a steady amplitude of said QAM signal;
   a means (B) for Performing a symbol timing recovery of said input QAM signal by adjusting a sampling clock of said symbol timing recovery loop;
   a means© for Performing a Blind Equalization of said QAM signal without carrier lock to minimize a dispersion error of said received QAM signal constellation as compared with an error-free QAM signal constellation by adjusting a set of coefficients of said equalizer;
   a means (D) for performing a carrier recovery of said QAM signal to eliminate a residual carrier frequency error and to eliminate a phase error from said acquired QAM signal; and
   a means (E) for Performing a decision directed equalization (DDE) of said QAM signal by updating a set of coefficients of said equalizer by using a decision based algorithm.

2. The apparatus of claim 1, wherein said means (A) further comprises:
   (A1) a State machine progressing from an initial State to a final State; said State machine comprising: a symbol timing recovery loop; a carrier loop; a coarse frequency loop; and an equalizer wherein said State machine is configured to enter AGC Maximum Sub-State.

3. The apparatus of claim 2, wherein said means (A1) further comprises:
   said State machine configured to enter said AGC Maximum Sub-State and further configured to perform computing, averaging and comparing to a target level an output power at Nyquist filter, wherein said output power represents the average power in said QAM signal constellation, and wherein an error signal between said average power in said QAM signal constellation and said output target power level is used to maintain a steady QAM signal amplitude.

4. The apparatus of claim 1, wherein said means (A) further comprises:
   (A2) a State machine progressing from an initial State to a final State; said State machine comprising: a symbol timing recovery loop; a carrier loop; a coarse frequency loop; and an equalizer wherein said State machine is configured to enter State AGC Coarse Estimate Sub-State.

5. The apparatus of claim 4, wherein said means (A2) further comprises:
   (A2, 1) said State machine configured to enter said AGC Maximum Sub-State and further configured to perform a coarse frequency estimation of said QAM signal frequency drift over a long period of time due to aging, temperature changes, humidity changes, etc., in order to obtain a set of frequency corrections, and to apply said set of frequency corrections to a set of frequency offsets in said coarse frequency loop.

6. The apparatus of claim 1, wherein said means (B) further comprises:
   (B1) a State machine progressing from an initial State to a final State; said State machine comprising: a symbol timing recovery loop; a carrier loop; a coarse frequency loop; and an equalizer wherein said State machine is configured to enter State Clock 1 State.

7. The apparatus of claim 6, wherein said means (B1) further comprises:
   (B1, 1) said State machine configured to enter State Clock 1 State and further configured to perform adjusting said sampling clock of said symbol timing recovery loop re-adjusting said sampling clock of said symbol timing recovery loop to optimize said symbol timing recovery of said input QAM signal.

8. The apparatus of claim 1, wherein said means (B) further comprises:
   (B2) a State machine progressing from an initial State to a final State; said State machine comprising: a symbol timing recovery loop; a carrier loop; a coarse frequency loop; and an equalizer wherein said State machine is configured to enter Clock 2 State.

9. The apparatus of claim 8, wherein said means (B2) further comprises:
   (B2, 1) said State machine configured to enter State Clock 2 State and further configured to perform re-adjusting said set of frequency coefficients and re-adjusting said set of phase coefficients of said symbol loop to optimize said symbol timing recovery.

10. The apparatus of claim 1, method wherein said means (C) further comprises:
    (C1) a State machine progressing from an initial State to a final State; said State machine comprising: a symbol timing recovery loop; a carrier loop; a coarse frequency loop; and an equalizer wherein said State machine is configured to enter Blind State.

11. The apparatus of claim 10, wherein said means (C1) further comprises:
    (C1, 1) said State machine configured to enter Blind State and further configured to substantially continuously perform a modulus update of said set of equalizer coefficients.

12. The apparatus of claim 1, wherein said means (D) further comprises:
    (D1) a State machine progressing from an initial State to a final State; said State machine comprising: a symbol timing recovery loop; a carrier loop; a coarse frequency loop; and an equalizer causing; wherein said State machine is configured to enter Carrier 1 State.

13. The apparatus of claim 12, wherein said means (D1) further comprises:

said State machine configured to enter Carrier 1 State and further configured to perform
  (D1, 1) adjusting said set of frequency coefficients of said carrier loop;
  and
  (D1, 2) adjusting said set of phase coefficients of said carrier loop.

14. The apparatus of claim 1, wherein said means (D) further comprises:
  (D2) a State machine progressing from an initial State to a final State; said State machine comprising: a symbol timing recovery loop; a carrier loop; a coarse frequency loop; and an equalizer wherein said State machine is configured to enter Carrier 2 State.

15. The apparatus of claim 14, wherein said means (D2) further comprises:
  (D2, 1) said State machine configured to enter Carrier 2 State and further configured to perform re-adjusting said set of frequency coefficients and said set of phase coefficients of said carrier loop to optimize said carrier acquisition of said QAM signal.

16. The apparatus of claim 1, wherein said means (E) further comprises:
  (E1) a State machine progressing from an initial State to a final State; said State machine comprising: a symbol timing recovery loop; a carrier loop; a coarse frequency loop; and an equalizer wherein said State machine is configured to enter DDE 1 State.

17. The apparatus of claim 16, wherein said means (E1) further comprises:
  (E1, 1) said State machine configured to enter DDE 1 State and further configured to utilize using a step size coefficient in said DDE algorithm to determine the error feedback from said carrier loop to said equalizer.

18. The apparatus of claim 1, wherein said means (E) further comprises:
  (E2) a State machine progressing from an initial State to a final State; said State machine comprising: a symbol timing recovery loop; a carrier loop; a coarse frequency loop; and an equalizer wherein said State machine is configured to enter DDE 2 State.

19. The apparatus of claim 18, wherein said means (E2) further comprises:
  (E2, 1) said State machine configured to enter DDE 2 State and further configured to perform re-adjusting said step size coefficient in said DDE algorithm to optimize said error feedback from said carrier loop to said equalizer.

20. The apparatus of claim 1, wherein said means (E) further comprises:
  (E3) a State machine progressing from an initial State to a final State; said State machine comprising: a symbol timing recovery loop; a carrier loop; a coarse frequency loop; and an equalizer wherein said State machine is configured to enter Tracking State.

21. The apparatus of claim 20, wherein said means (E3) further comprises:
  (E3, 1) said State machine configured to enter Tracking State and further configured to perform tracking said QAM signal by re-adjusting said step size coefficient in said DDE algorithm.

22. The apparatus of claim 1 further comprising:
  a means (F) for cycling said State machine back to Reset State.

23. The apparatus of claim 22, wherein said means (F) further comprises:
  (F1) said State machine configured to cycle back to Reset State and further configured to perform re-acquiring a lost QAM signal while said State machine stays in said Reset State.

24. An apparatus for automated acquisition of a QAM signal, said apparatus employing a State machine progressing from an initial State to a final State; said State machine comprises:
  (A) an AGC State, wherein said State machine in said AGC State is configured to perform an automatic gain control (AGC) operation on said incoming QAM signal to maintain a steady amplitude of said QAM signal; said AGC State further comprises:
    a Minimum Sub-State further comprising: Coarse Estimate Sub-State;
    and
    an AGC Lock Sub-State further comprising Maximum Sub-State;
  (B) a Clock 1 State, wherein said State machine in said Clock 1 State is configured to perform an initial symbol timing recovery of said input QAM signal; said Clock 1 State further comprises:
    a Minimum Sub-State;
    and
    a Maximum Sub-State;
  (C) a Clock 2 State, wherein said State machine in said Clock 2 State is configured to perform an optimized symbol timing recovery of said input QAM signal; said Clock 2 State further comprises:
    a Minimum Sub-State;
    and
    a Maximum Sub-State;
  (D) a Blind State, wherein said State machine in said Blind State is configured to perform a Blind Equalization of said QAM signal without carrier lock to minimize a dispersion error of said received QAM signal constellation as compared with an error-free QAM signal constellation; said Blind State further comprises:
    a Minimum Sub-State;
    a Threshold Sub-State further comprising a Maximum Sub-State;
    and
    a Hysteresis Sub-State;
  (E) a Carrier 1 State, wherein said State machine in said Carrier 1 State is configured to perform a carrier recovery of said QAM signal to eliminate a residual carrier frequency error; said Carrier 1 State further comprises:
    a Minimum Sub-State;
    a Threshold Sub-State further comprising a Maximum Sub-State further comprising a Sweep Sub-State;
    and
    a Hysteresis Sub-State;
  (F) a Carrier 2 State, wherein said State machine in said Carrier 2 State is configured to perform a carrier recovery of said QAM signal to eliminate a residual carrier phase error; said Carrier 2 State further comprises:
    a Minimum Sub-State;
    a Threshold Sub-State further comprising a Maximum Sub-State;
    and
    a Hysteresis Sub-State;
  (G) a DDE 1 State, wherein said State machine in said DDE 1 State is configured to perform a decision directed equalization (DDE) of said QAM signal, wherein an equalizer coefficients are updated by using a decision directed (DDE) algorithm, and wherein said decision directed algorithm (DDE) uses a step size coefficient to determine an error feedback from a carrier loop to said equalizer; said DDE 1 State further comprises:

a Minimum Sub-State;

a Threshold Sub-State further comprising a Maximum Sub-State;

and a Hysteresis Sub-State;

(H) a DDE 2 State, wherein said State machine in said DDE 2 State is configured to perform a decision directed equalization (DDE) of said QAM signal by re-adjusting said step size coefficient in said DDE algorithm to optimize said error feedback from said carrier loop to said equalizer; said DDE 2 State further comprises:

a Minimum Sub-State;

a Threshold Sub-State further comprising a Maximum Sub-State;

and a Hysteresis Sub-State;

(I) a Tracking State, wherein said State machine in said Tracking State is configured to perform tracking of the QAM signal by re-adjusting said step size coefficient in said DDE algorithm; said Tracking State further comprises:

a Minimum Sub-State;

and a Threshold Sub-State further comprising a Maximum Sub-State; and (K) a Reset State, wherein said State machine is configured to cycle back to said Reset state to re-acquire a lost QAM signal.

* * * * *